US011307115B2

(12) United States Patent
Haller et al.

(10) Patent No.: US 11,307,115 B2
(45) Date of Patent: Apr. 19, 2022

(54) VALVE TEST CONNECTION

(71) Applicant: Automatic Switch Company, Florham Park, NJ (US)

(72) Inventors: John J. Haller, Boonton, NJ (US); Ryan Huttman, Milford, PA (US); John Zawisa, Morristown, NJ (US); Roberto Pardo, Pregnana Milanese (IT)

(73) Assignee: AUTOMATIC SWITCH COMPANY, Florham Park, NJ (US)

( * ) Notice: Subject to any disclaimer, the term of this patent is extended or adjusted under 35 U.S.C. 154(b) by 102 days.

(21) Appl. No.: 16/297,688

(22) Filed: Mar. 10, 2019

(65) Prior Publication Data

US 2020/0284685 A1    Sep. 10, 2020

(51) Int. Cl.
*G01M 3/40* (2006.01)
*F16K 37/00* (2006.01)
*H01R 13/52* (2006.01)

(52) U.S. Cl.
CPC .......... *G01M 3/40* (2013.01); *F16K 37/0041* (2013.01); *F16K 37/0083* (2013.01)

(58) Field of Classification Search
CPC .... G01R 31/50; G01R 31/72; G01R 31/2829; G01R 31/52; F16K 37/0083; F16K 37/0041; H01R 13/5202; H01R 13/74; G01M 3/40
See application file for complete search history.

(56) References Cited

U.S. PATENT DOCUMENTS

| 4,308,891 A | 1/1982 | Loup |
| 4,418,720 A | 12/1983 | Day et al. |
| 4,683,454 A | 7/1987 | Vollmer et al. |
| 4,889,164 A | 12/1989 | Hozumi et al. |
| 5,069,072 A | 12/1991 | Taylor et al. |
| 5,269,490 A | 12/1993 | Fujikawa et al. |
| 5,477,149 A | 12/1995 | Spencer et al. |
| 5,524,484 A | 6/1996 | Sullivan |
| 5,558,311 A | 9/1996 | Connolly et al. |
| 5,710,552 A | 1/1998 | McCoy et al. |

(Continued)

FOREIGN PATENT DOCUMENTS

| CN | 201307147 Y | 9/2009 |
| CN | 101726407 B | 12/2011 |

(Continued)

OTHER PUBLICATIONS

"How to Detect a Faulty Solenoid," sciencing.com. Accessed Apr. 25, 2018.

(Continued)

*Primary Examiner* — Brandi N Hopkins
(74) *Attorney, Agent, or Firm* — Mackey Law Firm PLLC

(57) ABSTRACT

A test connection for a valve can include a plug configured to be removably coupled with a conduit opening, an electrical coupler coupled to the plug, and one or more test leads coupled to the electrical coupler. One or more test leads can be removably coupled with a solenoid coil or other valve component. A method of configuring a valve can include providing one or more test connections coupled to the valve, testing the valve prior to final installation using the test connection, removing the test connection and permanently installing the valve.

19 Claims, 2 Drawing Sheets

(56) References Cited

U.S. PATENT DOCUMENTS

| | | |
|---|---|---|
| 5,712,434 A | 1/1998 | Sylvis |
| 5,811,671 A | 9/1998 | Seekircher et al. |
| 6,038,918 A | 3/2000 | Newton |
| 9,759,760 B2 | 9/2017 | Leif |
| 2014/0065895 A1 | 3/2014 | Tomita et al. |

FOREIGN PATENT DOCUMENTS

| | | | |
|---|---|---|---|
| CN | 206726084 U | 12/2017 | |
| DE | 102007022275 B3 * | 10/2008 | ........... F02M 61/168 |
| DE | 102007022275 B3 | 10/2008 | |
| DE | 102016225724 A1 | 6/2018 | |
| WO | 2009009640 A1 | 1/2009 | |

OTHER PUBLICATIONS

"3-39. Solenoid Valve Testing and Coil Replacement," operatormanuals.tpub.com. Accessed Apr. 25, 2018.
International Search Report and Written Opinion of the International Searching Authority dated Jun. 8, 2020 for International Application No. PCT/US2020/021782.

\* cited by examiner

VALVE TEST CONNECTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to valves and more specifically relates to test connections for valves.

Description of the Related Art

A valve can generally include a valve body for routing fluid from an inlet to an outlet and an actuator for controlling fluid flow through the valve. Some valves, such as solenoid valves, can include actuators that include one or more electronical components, such as solenoid coils, wiring components, controllers or other electromechanical valve actuator components. Such components can be wholly or partially housed in one or more enclosures or housings that have conduit openings in removable covers or elsewhere for routing wires or other conduits into and out of the valve for providing electrical power to the valve, allowing communication between the valve and other components of a valve system and the like. Valves of this nature can be configured and used for a variety of different purposes in various industries and can include general purpose valves as well as more specialized valves, such as "explosion proof" (i.e., explosion resistant) valves or other valves designed for use in hazardous environments where resistance to moisture, chemicals, shock, vibration or other environmental characteristics may be of particular importance.

As an example, an explosion proof solenoid valve may be shipped to a customer for installation or to an assembler to be assembled into a skid or other system that will eventually be shipped to a final location. Prior to shipment, the current practice in the industry is to seal the solenoid valve enclosure for shipment by securing the cover in place and inserting a seal, either by friction or threading, into the conduit opening of the enclosure. Upon final installation of the solenoid valve, an electrician will remove the seal and enclosure cover. The solenoid can then be wired for the atmosphere or installation via applicable cables or conduits and the cover re-assembled. However, before final wiring, there may be a need on the part of the customer or assembler to electrically test the solenoid valve one or more times before final installation. In the current state of the art, this involves removal of the enclosure cover and the wiring of temporary test leads to the solenoid coil. After each test, the temporary wiring is removed, and the enclosure cover is replaced and sealed to protect the components between the time of testing and the time of final installation. Accordingly, current practices can be time consuming and labor intensive, and also carry increased risk of damaged or incorrectly repositioned parts or improper seals potentially exposing the solenoid to damage.

The disclosures and teachings herein are directed to systems and methods for improved valves and test connections for valves.

BRIEF SUMMARY OF THE INVENTION

A valve, such as a solenoid valve, can have one or more enclosures or housings and one or more valve bodies and can include one or more conduit openings, such as holes or other passageways, for receiving or routing wires, conduits and/or other components into or out of one or more portions of the valve. A test connection, such as a fitting, connector, coupler or other connection for testing a valve, can be adapted for coupling with one or more conduit openings, removably, permanently or otherwise. In at least one embodiment, a test connection can include a plug, such as an at least partially elastomeric and/or rigid plug, for coupling with a conduit opening, such as by press fit, interference fit, friction fit, threads, or other coupling means, separately or in combination, in whole or in part. A test connection can include one or more electrical couplers coupled to a plug, such as terminals, male or female plug connectors, or other structure for conducting or transmitting electricity or electrical signals. A test connection can include one or more test leads coupled to one or more electrical couplers, such as wires, pigtails, or other electrical leads. In at least one embodiment, one or more test leads can have one end for coupling with a component of a valve, such as, for example, a solenoid coil or other electrical component of a solenoid valve, and another end for coupling to a plug or a portion thereof, such as an electrical coupler coupled to a plug. An electrical coupler can be coupled to a plug in one or more ways, which can, but need not, include being formed integrally therewith, such as by way of being embedded or molded therein.

In at least one embodiment, a plug can be adapted for sealingly coupling with one more conduit openings for at least partially limiting ingress or egress of water, moisture, or other materials into or out of a valve, which can, but need not, include utilization of one or more gaskets or seals. In at least one embodiment, which is but one of many, a plug can be made at least partially from rubber or another elastomeric material and can be sized and shaped for sealingly coupling with a conduit opening upon being inserted therein and/or otherwise coupled thereto, which can include having any size or shape according to an implementation of the disclosure. For example, a plug can have the same or a similar shape as a corresponding conduit opening and can have a larger outside dimension or cross-sectional area then a conduit opening yet be flexible enough to fit at least partially within the conduit opening and sealingly engage the opening or the structure in which the opening exists. A plug can, but need not, have one or more extensions or other outwardly extending structures on an exterior service thereof for supporting coupling with and/or sealing engagement with a conduit opening.

A test connection can include one or more ends such as first, second, or other ends, which can be or include opposite ends or longitudinally opposite ends. For example, a test connection or plug can have one end for being disposed at least partially within a solenoid enclosure or other valve enclosure and another end for being disposed at least partially outside of the enclosure. In at least one embodiment, one more test leads can be adapted for removable coupling with one or more components of a valve, which can include a solenoid coil or one or more other electrical components of the valve, such as wiring, terminal blocks, or other valve components for supporting operation of a valve actuator, such as a solenoid actuator. One or more electrical couplers can be at least partially embedded or otherwise disposed in a plug of a test connection. In at least one embodiment, a plug can be at least partially elastomeric. In at least one embodiment, a plug or test connection can be configured for threadingly coupling with a conduit opening, such as by having male or female threads adapted for engaging mating threads on or in a conduit opening or one or more valve components coupled thereto or therewith. In at least one embodiment, a plug can be adapted for coupling with a conduit opening by press fit, such as by interference fit, or friction fit, separately or in combination, in whole or in part.

In at least one embodiment, a test connection or a portion thereof, such as a plug, can have one or more outside dimensions, such as a major dimension, a minor dimension, or another dimension. In at least one embodiment, a plug can have a dimension or cross-sectional area that varies along its length (or another dimension or direction). In at least one embodiment, a portion of a plug, such as an end or other portion, can have an outside dimension or other dimension that is larger or smaller than a dimension of another portion of the plug, which can include another end of the plug.

In at least one embodiment, a test connection or a portion thereof, such as a plug, can be at least partially cylindrical. For example, at least a portion of a plug between two ends, which can include one or more of the ends or portions thereof, can be at least partially cylindrical. A plug can, but need not, have one or more ribs, such as annular or other ribs, that extend radially outwardly from an exterior surface or other portion thereof. As another example, a plug can, but need not, have one or more other ribs, such as a linear rib that extends radially outwardly from an exterior service or other portion thereof. For instance, a plug can have one or more linear or other ribs parallel or about parallel to an axis thereof, such as a central longitudinal axis, which rib or ribs can, but need not, intersect one or more other ribs, such as one or more annular ribs (if present). In at least one embodiment of a plug having a plurality of ribs, two or more ribs can have heights or other dimensions relative to an exterior surface or other portion of a test connection. Two or more ribs can have a height or other dimension(s) that are the same or that are different. For example, in at least one embodiment, one or more annular ribs can have a different dimension than one or more linear ribs, which can include being taller or shorter than such ribs, separately or in combination, in whole or in part. Two or more ribs can, but need not, intersect along a portion of the body of a test connection or plug. In at least one by embodiment, a test connection or plug can include two or more ribs that are at least partially perpendicular or orthogonal to one another. As another example, two or more ribs can be at least partially parallel to one another.

In at least one embodiment a valve, such as a solenoid valve, can include an enclosure or housing, such as a solenoid enclosure, having one or more conduit openings for having one or more wires or other conduits routed there in or therethrough. For example, a conduit opening, or other opening, can be adapted for allowing wires or other conduits to communicate with one or more components inside of a valve enclosure or housing and with one or more components or valve system components disposed outside of the valve enclosure or housing, such as, for example, valve control or monitoring equipment, or as another example, one or more other valves. A valve, such as a solenoid valve or other type of valve, can include one or more test connections coupled thereto or adapted to be coupled thereto, which can be or include any test connection according to the present disclosure.

In at least one embodiment, a method of configuring a valve, such as a solenoid valve, for installation or operation can include providing a test connection for coupling therewith. It's a valve, such as a solenoid valve, can have an enclosure, such as a solenoid enclosure, coupled to a valve body and can have one or more conduit openings in fluid communication with a portion of the valve. The conduit opening can be adapted for having one or more wires or other conduits dispose therethrough and, in at least one embodiment, can be at least partially disposed in a cover or other portion of the valve, which can be or include any portion of a valve enclosure or housing. In at least one embodiment, a method of configuring a solenoid valve, such as for shipment, testing, operation, or installation, can include providing a test connection or a plurality of test connections. One more test connections can include a plug in adapted to be removably coupled to a conduit opening, one or more electrical couplers, which can be coupled to the plug, and one or more test leads electrically coupled to the one or more electrical couplers. A test lead can have a first and for other end for electrical communication with a solenoid coil of a solenoid valve and/or one or more other electrical components of a valve, whether a solenoid valve or otherwise. A method can include removably coupling the plug to a conduit having and removably coupling at least one of a plurality of test leads in electrical communication with a solenoid coil or other electrical component.

In at least one embodiment, a method can include sealingly coupling one or more plugs to one or more conduit openings of valve, which can be or include fully or partially watertight coupling, such as for at least minimizing ingress or egress of water, moisture, dust or other foreign substances into or out of a valve enclosure housing. In at least one embodiment, a method can include coupling one or more plugs to a valve cover and coupling the cover to a valve enclosure or housing. A method can include coupling at least one wire in electrical communication with one or more electrical couplers of a test connection. A method can include testing a valve, such as a solenoid valve, without uncoupling the test connection from the valve or, as another example, without uncoupling it cover or other removable housing or enclosure portion from a valve. A method can include uncoupling one or more test leads from one or more valve components and removing a test connection from a valve. A method can include replacing one or more test connections with a wiring harness or other components routed in or through the conduit opening, such as one or more wires or components affiliated with permanent installation of the valve in a valve system or otherwise.

DETAILED DESCRIPTION

Figure 1:
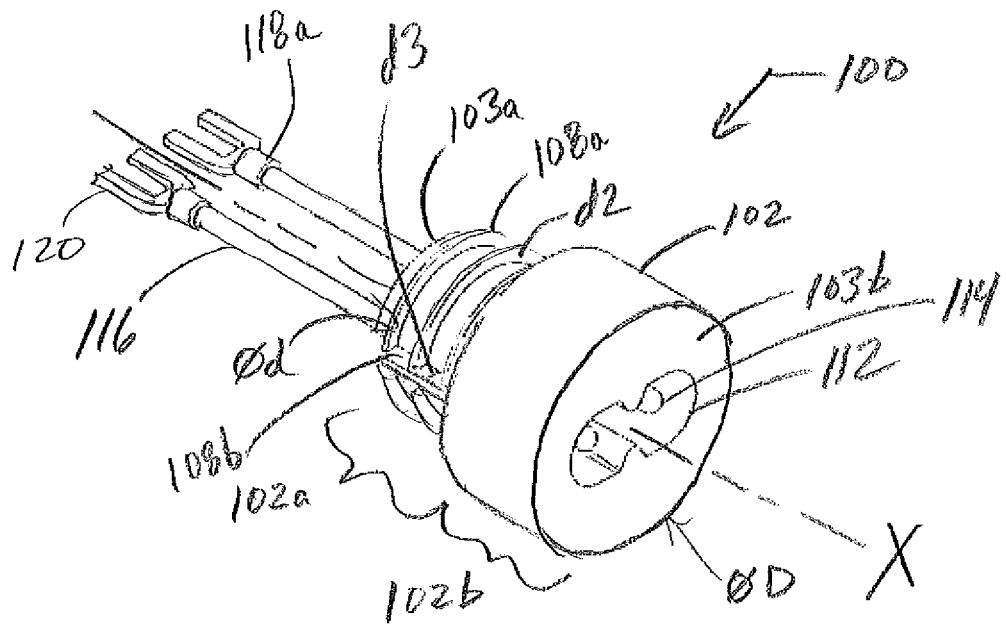
FIG. 1 is a perspective view of one of many embodiments of a valve test connection according to the disclosure.

The Figures described above and the written description of specific structures and functions below are not presented to limit the scope of what Applicants have invented or the scope of the appended claims. Rather, the Figures and written description are provided to teach any person skilled in the art to make and use the invention(s) for which patent protection is sought. Those skilled in the art will appreciate that not all features of a commercial embodiment of the disclosure are described or shown for the sake of clarity and understanding. Persons of skill in this art will also appreciate that the development of an actual commercial embodiment incorporating aspects of the present disclosure can require numerous implementation-specific decisions to achieve the developer's ultimate goal for the commercial embodiment (s). Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts nevertheless would be a routine undertaking for those of skill in the art having the benefits of this disclosure. The embodiment(s) disclosed and taught herein are susceptible to numerous and various modifications and alternative forms. The use of a singular term, such as, but not limited to, "a," is not intended as limiting of the number of items. The use of relational terms, such as, but not limited to, "top," "bottom," "left," "right," "upper," "lower," "down," "up," "side," "first," "second," ("third" et seq.), "inlet," "outlet" and the like are used in the written description for clarity in specific reference to the Figures and are not intended to limit the scope of the disclosure or the appended claims unless otherwise indicated. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one member with another in a unity fashion. The coupling can occur in any direction, including rotationally. The terms "include" and "such as" are illustrative and not limitative, and the word "can" means "can, but need not" unless otherwise indicated. Notwithstanding any other language in the present disclosure, the embodiment(s) shown in the drawings are examples presented for purposes of illustration and explanation and are not the only embodiments of the subject(s) hereof.

Applicants have created systems and methods for improved valves, such as solenoid valves, having advantageous features for testing prior to final installation into a valve system or other fluid control system. A valve can include one or more test connections comprising a plug and an electrical connection that can, for example, be factory installed by a valve manufacturer prior to shipment or other distribution of the valve. The one or more test connections can support testing of the valve or one or more components of the valve, such as a solenoid actuator or solenoid coil on one or more occasions prior to final or permanent installation of the valve without the need for superfluous disassembly and/or reassembly of the valve enclosure or housing that can increase the likelihood of valve failure or operational problems due to damage to the valve or a portion of the valve, such as seals or enclosures. A test connection can be adapted for temporarily sealing a valve enclosure between manufacture and installation, for supporting testing of a valve between manufacture and installation and for easy removal upon final installation of the valve into a fluid control system.

The systems and methods of the present disclosure can provide a cost-effective solution to the problem of minimizing risk of valve damage between manufacturing and final installation of a valve. A test connection can comprise a relatively inexpensive plug connector incorporated with a conduit protector having pigtail or other lead connections enabling testing of the valve without potentially repeated disassembly and reassembly of a valve cover or enclosure. For example, at the factory, before an enclosure cover is installed, the test connection according to the disclosure can be coupled to a conduit opening in a solenoid enclosure. Temporary pigtail leads can be wired to terminal connections of one or more components, such as the solenoid coil. The enclosure cover can then be installed on the housing to seal the assembly. In at least one embodiment, a test connection can include a relatively inexpensive commercially available electrical power plug connection, which can allow commercially available cord sets to be used by a customer or similar to apply power to the solenoid valve to test its operation without having to open or disassemble the solenoid enclosure. One example of such a commercially available connection is an International Electrotechnical Commission ("IEC") 60320 C8 "FIG. 8" plug or connector, although many other configurations or options are available. Upon final installation, an installer can remove the test connection, which can but need not, be disposable, and can perform final wiring of the solenoid valve with greater confidence that no damage to the valve has occurred between the time of manufacture and the time of installation.

Figure 2:
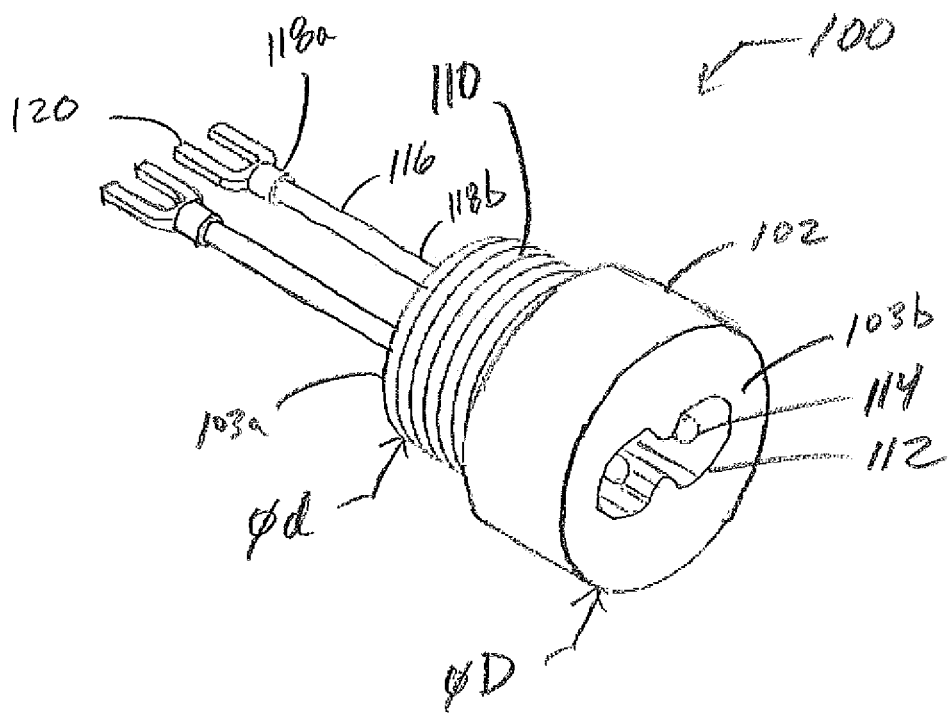
FIG. 2 is a perspective view of another of many embodiments of a valve test connection according to the disclosure.
Figure 3:
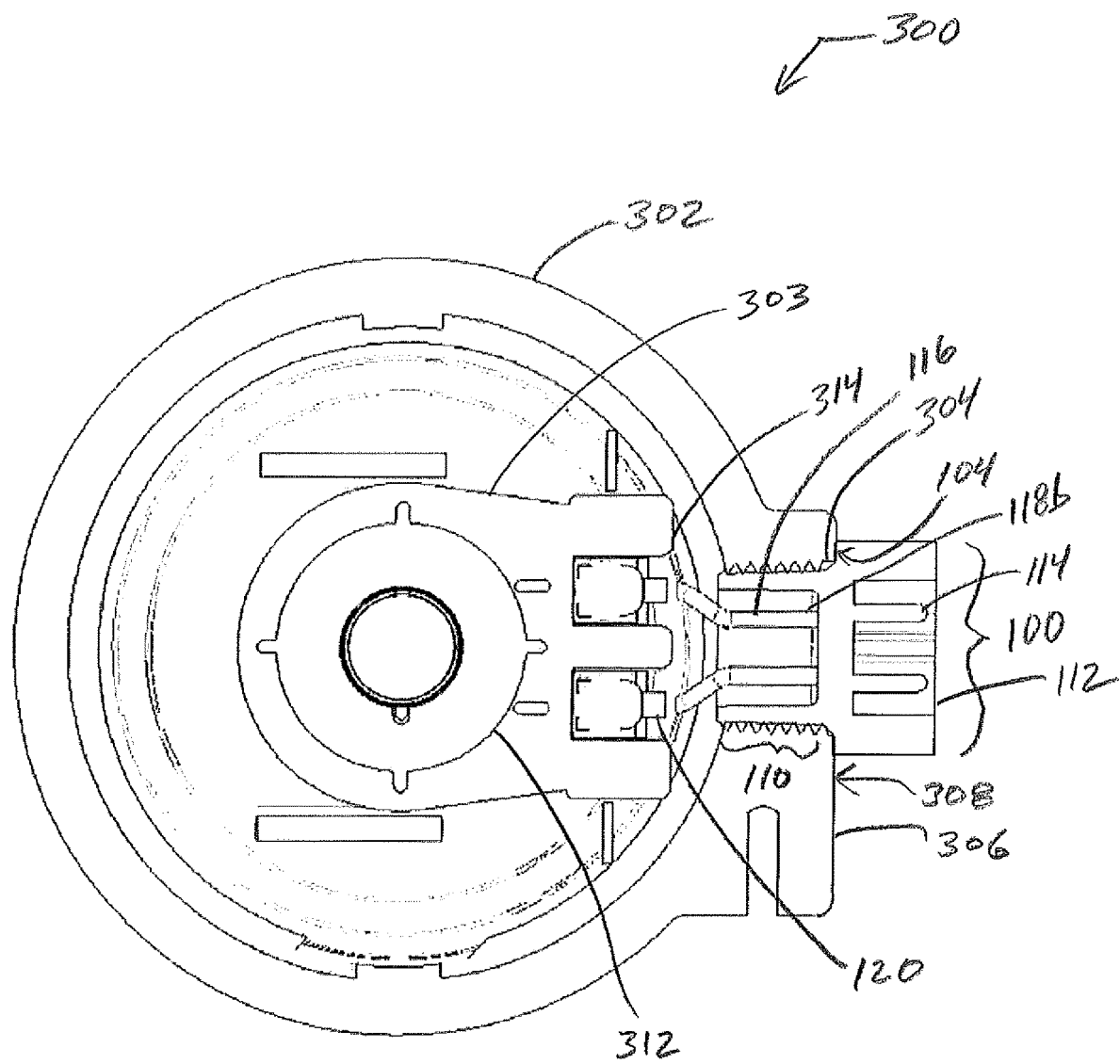
FIG. 3 is a top cross-sectional view of one of many embodiments of a solenoid valve having a test connection according to the disclosure.

FIG. 1 is a perspective view of one of many embodiments of a valve test connection according to the disclosure. FIG. 2 is a perspective view of another of many embodiments of a valve test connection according to the disclosure. FIG. 3 is a top cross-sectional view of one of many embodiments of a solenoid valve having a test connection according to the disclosure. FIGS. 1-3 will be described in conjunction with one another.

As shown, for example, in FIG. 3, a valve 300, such as a solenoid valve, can have one or more enclosures 302, or housings, for at least partially housing or otherwise supporting a valve actuator 303, such as a solenoid actuator. An enclosure 302 can include one or more conduit openings 304, such as holes, openings, or other passageways, for receiving or routing wires, conduits and/or other components into or out of one or more portions of valve 300 and supporting communication or other functionality among internal and external components of valve 300 or a system in which valve 300 may be incorporated (e.g., valve control or monitoring equipment, or one or more other valves). A test connection 100, such as a fitting, connector, coupler or other connection for testing a valve, can be adapted for coupling with one or more conduit openings 304 and/or enclosures 302, removably, permanently or otherwise, and can be adapted for supporting valve testing as further described below.

In at least one embodiment, a test connection 100 according to the disclosure can include a body 102, such as a casing, encapsulation or housing, for enclosing, protecting or otherwise supporting one or more other components of test connection 100. Test connection 100 can include one or more ends, such as first, second, or other ends, which can be or include opposite ends or longitudinally opposite ends. For example, test connection 100 can have one end 103*a* for being disposed at least partially within a valve enclosure 302 or conduit opening 304 and another end 103b for being disposed at least partially outside of the enclosure.

Body 102 can be a single, unitary body or can include a plurality of body portions coupled together and can be formed in any shape, size or manner for coupling with an opening in a valve 300, such as a conduit opening 304 (see FIG. 3), according to an implementation of the disclosure. For example, as shown in the exemplary embodiments of FIGS. 1-3 for illustrative purposes, which embodiments are but some of many, body 102 can be at least partially cylindrical or generally cylindrical. However, this need not be the case and, alternatively, or collectively, body 102 can be or include another shape, in whole or in part, such as triangular, square, rectangular, pentagonal, hexagonal, or otherwise, which can include having any number of sides according to an implementation of the disclosure. As other examples, body 102 or a portion thereof can be elliptical, oblong, or irregularly shaped, in whole or in part. Body 102 can be adapted for coupling with one or more conduit openings 304 (see FIG. 3).

In at least one embodiment, body 102 can include a plurality of body portions, such as a first body portion 102a and a second body portion 102b. Body portions 102a, 102b (if present) can be formed integrally or formed separately and coupled to one another, separately or in combination with one or more other portions (if present) of body 102. For example, first body portion 102a can be or include a plug or insert adapted to be disposed at least partially within and/or through a conduit opening 304 and second body portion 102b can be a top or cap for engaging enclosure 302 or a portion thereof, such as a cover 306 or another portion of enclosure 302 having conduit opening 304 therein or in fluid communication with conduit opening 304 (e.g., tubing, piping, insulation or other structure (not shown) for supporting or routing one or more wires). For instance, portion 102b can have a contact surface 104 for contacting an exterior surface 308 of enclosure 302 about conduit opening 304. Contact surface 104 can be or include an external or other surface of portion 102b or, as another example, can be or include a seal, such as an O-ring or grommet, for sealingly engaging enclosure 302 or portion thereof. In such an embodiment, which is but one of many, portion 102b can have an outside dimension D greater than an outside dimension d of first body portion 102a (such dimensions can, but need not, be diameters).

Test connection 100 can be made from any material according to a particular implementation of the disclosure, separately or in combination, in whole or in part. For example, test connection 100 or a portion thereof, such as first body portion 102a and/or second body portion 102b, can be made from rubber or another elastomeric material. As another example, all or a portion of test connection 100 can be made from a more rigid material(s), such as plastic, metal, or another material. In at least one embodiment, body 102 can have a dimension, shape, or cross-sectional area that varies along its length (or another dimension or direction). In at least one embodiment, a portion of body 102, such as an end 103a, 103b or another portion, can have an outside dimension or other dimension larger or smaller than a dimension of another portion of body 102, which can be or include another end 103a, 103b.

In at least one embodiment, test connection 100 can be adapted for coupling with enclosure 302 and/or conduit opening 304 and for at least partially resisting removal therefrom. For example, test connection 100 or a portion thereof, such as one or both of body portions 102a, 102b, can include or be adapted to couple with one or more couplers for coupling with one or more valve components or otherwise supporting coupling of test connection 100 and valve 300. As shown in the exemplary embodiment of FIG. 1, which is but one of many, test connection 100 can include one or more ribs 108, such as tongues or extensions, for cooperating with valve 300 or a portion thereof when test connection 100 is coupled thereto. In such an embodiment, which can, but need not, be made at least partially from an elastomeric material, test connection 100 can include, for example, one or more annular ribs 108a for engaging at least a portion of conduit opening 304, such as interior surface 310. Alternatively, or collectively, test connection 100 can include one or more linear ribs 108b for engaging enclosure 302 or conduit opening 304. Ribs 108a, 108b (collectively, ribs 108) can extend radially outwardly from body 102, such as about central longitudinal axis X, for example such that major dimension D of body portion 102a or a portion thereof is greater than or equal to a dimension d1 of conduit opening 304, such as an inside diameter or other interior dimension. In this manner, one or more ribs 108 can be deformed or compressed by or otherwise engage conduit opening 304 or another portion of enclosure 302 upon being coupled therewith and can at least partially resist loosening or removal therefrom, particularly unintentional removal due to exterior forces such as vibration, movement during shipping, or the like. In at least one embodiment, however, test connection 100 can have one or more ribs 108 for at least partially resisting relatively greater removal forces, which can include intentional removal forces, such as by having one or more ribs 108 adapted to plastically or otherwise deform upon insertion or other coupling of test connection 100 with enclosure 302.

In an embodiment having a plurality of ribs 108, two or more ribs 108 can have shapes and/or sizes that are the same or different from one another. For instance, one or more ribs 108 can have a dimension d2, such as a height or other dimension, and one or more other ribs can have a dimension d3, and dimensions d2 and d3 can be the same or different from one another. As shown in the exemplary embodiment of FIG. 1, for example, one or more linear ribs 108b can have a dimension d3 relative to an outside surface of body 102 that is greater than a dimension d2 of one or more annular ribs 108a. However, this need not be the case, and any of ribs 108 can have any dimension or shape according to an implementation of the disclosure. In at least one embodiment, one or more ribs 108 can be adapted for coupling with a conduit opening 304 by press fit, interference fit, or friction fit, separately or in combination with one another or other coupling features, in whole or in part. In at least one embodiment, one or more ribs 108 can be adapted for supporting coupling with a conduit opening 304 in or more other or additional manners. For example, one or more ribs 108, such as a linear rib(s) 108b, can be adapted for supporting alignment of test connection 100 with conduit opening 304, such as by mating or aligning with one or more corresponding grooves (not shown) in or on enclosure 302 or opening 304.

Ribs 108 can be arranged or configured in any shape, pattern, or direction according to an implementation of the disclosure. For instance, one or more linear ribs 108b or other ribs can be parallel (including about parallel) to one another and/or to an axis or other portion of body 102, such as central longitudinal axis X, and can, but need not, intersect one or more other ribs, such as one or more annular ribs 108a (if present). Two or more ribs 108 can, but need not, intersect along a portion of body 102 or test connection 100. In at least one embodiment, test connection 100 can include two or more ribs 108 that are at least partially perpendicular or orthogonal (including about perpendicular or orthogonal) to one another. As another example, two or more ribs 108a can be at least partially parallel to one another. Any of ribs 108 can be continuous or segmented and can be disposed along any portion of body 102 in any number.

In at least one embodiment, test connection 100 can be adapted for coupling with enclosure 302 or conduit opening 304 and one or more different or additional manners. For example, test connection 100 can include one or more couplers 110 for coupling with an interior or other portion of opening 304, whether separately or in combination with one or more ribs 108 (if present). In at least one embodiment, coupler 110 can be or include threads for engaging mating threads of conduit opening 304. In at least one embodiment, coupler 110 can be or include ridges or other extensions that elastically or plastically deform upon coupling of test connection 100 and conduit opening 304. As other examples, a test connection 100 according to the disclosure can include or be adapted for cooperating with one or more other couplers or types of couplers, which can include, but which are not limited to, fasteners, such as screws, bolts or other commercially available fasteners, adhesives, quarter turn couplers, tongue and groove couplers, or other coupling structure(s), separately or in combination with one another and/or with one or more of ribs 108 or coupler 110.

In at least one embodiment, test connection 100 can include one or more electrical couplers 112, such as a male or female plug, connector, or receptacle, for allowing or otherwise supporting electrical communication in or through test connection 100. Coupler 112 can be or include one or more terminals 114, such as electrodes or pins, for conducting or transmitting electricity or electrical signals. Coupler 112 can be or include any electrical connector or connection according to an implementation of the invention, which can include, but is not limited to, one or more male or female "FIG. 8" or other plugs or connection types known in the art. Test connection 100 can include one or more wires 116, such as test leads, pigtails, or other electrical or signal transmission media, such as fiberoptic cables or other signal conduits, coupled to one or more electrical couplers 112 for routing electricity or signals into and/or out of valve 300. For example, each wire 116 can have one end 118a for coupling with or being coupled in communication with one or more components of a valve 300, such as, for example, a solenoid coil 312 (if present) or other electrical valve component, and another end 118b coupled to electrical coupler 112 or a portion thereof, such as a terminal 114. In such an embodiment, test connection 100 can, but need not, include one or more electrical connectors 120, such as crimp connectors, spade connectors, or other types of connectors, coupled to one or more of wires 116 and adapted for coupling with valve 300 or a component thereof, such as solenoid coil 312 (if present) or another electrical component (e.g., terminal block 314). Electrical coupler 112 can be coupled to body 102 in any manner according to an implementation of the disclosure, which can, but need not, include being formed integrally therewith, such as by way of being embedded or molded therein, separately or in combination, in whole or in part.

With continuing reference to the Figures, one or more methods according to the disclosure will now be described in further detail. In at least one embodiment, one or more test connections 100 can be provided or arranged for coupling with one or more conduit openings 304 of valve 300 and/or another portion thereof, such as a valve enclosure 302 or cover 306. In at least one embodiment, a method of configuring a valve 300, such as a solenoid valve or other electrically or electronically actuated or controlled valve, for installation or operation can include providing one or more test connections 100 for coupling therewith and/or coupling one or more test connections 100 thereto. In at least one embodiment, a method can include configuring a valve 300 for shipment, testing, operation, or installation, which can include providing a test connection 100 or a plurality of test connections 100. A method can include removably coupling a test connection 100 to a conduit opening and removably coupling at least one of a plurality of wires 116 such as test leads in electrical communication with a solenoid coil or other electrical component of a valve 300.

In at least one embodiment, a method can include sealingly coupling one or more test connections 100 to one or more conduit openings 304 of a valve 300, which can be or include full or partial watertight coupling, such as for at least minimizing ingress or egress of water, moisture, dust or other foreign substances into or out of a valve enclosure 302. In at least one embodiment, a method can include coupling one or more test connections 100 to a valve cover 306 and coupling the cover 306 to a valve enclosure 302 or other housing. A method can include coupling at least one wire 116 in electrical communication with one or more electrical couplers 112 of a test connection 100. A method can include testing a valve 300, such as a solenoid valve, without uncoupling test connection 100 from the valve 300 or, as another example, without uncoupling a cover 306 or removable housing or enclosure portion from valve 300. A method can include uncoupling one or more wires 116 from one or more valve components and removing test connection 100 from valve 300. A method can include replacing one or more test connections 100 with a wiring harness or other components routed in or through a conduit opening 304, such as one or more wires or components affiliated with permanent installation of valve 300 in a valve system or otherwise.

A valve, such as a solenoid valve, can have one or more enclosures or housings and one or more valve bodies and can include one or more conduit openings, such as holes or other passageways, for receiving or routing wires, conduits and/or other components into or out of one or more portions of the valve. A test connection, such as a fitting, connector, coupler or other connection for testing a valve, can be adapted for coupling with one or more conduit openings, removably, permanently or otherwise. In at least one embodiment, a test connection can include a plug, such as an at least partially elastomeric and/or rigid plug, for coupling with a conduit opening, such as by press fit, interference fit, friction fit, threads, or other coupling means, separately or in combination, in whole or in part. A test connection can include one or more electrical couplers coupled to a plug, such as terminals, male or female plug connectors, or other structure for conducting or transmitting electricity or electrical signals. A test connection can include one or more test leads coupled to one or more electrical couplers, such as wires, pigtails, or other electrical leads. In at least one embodiment, one or more test leads can have one end for coupling with a component of a valve, such as, for example, a solenoid coil or other electrical component of a solenoid valve, and another end for coupling to a plug or a portion thereof, such as an electrical coupler coupled to a plug. An electrical coupler can be coupled to a plug in one or more ways, which can, but need not, include being formed integrally therewith, such as by way of being embedded or molded therein.

In at least one embodiment, a plug can be adapted for sealingly coupling with one more conduit openings for at least partially limiting ingress or egress of water, moisture, or other materials into or out of a valve, which can, but need not, include utilization of one or more gaskets or seals. In at least one embodiment, which is but one of many, a plug can be made at least partially from rubber or another elastomeric material and can be sized and shaped for sealingly coupling with a conduit opening upon being inserted therein and/or otherwise coupled thereto, which can include having any size or shape according to an implementation of the disclosure. For example, a plug can have the same or a similar shape as a corresponding conduit opening and can have a larger outside dimension or cross-sectional area then a conduit opening yet be flexible enough to fit at least partially within the conduit opening and sealingly engage the opening or the structure in which the opening exists. A plug can, but need not, have one or more extensions or other outwardly extending structures on an exterior service thereof for supporting coupling with and/or sealing engagement with a conduit opening.

A test connection can include one or more ends such as first, second, or other ends, which can be or include opposite ends or longitudinally opposite ends. For example, a test connection or plug can have one end for being disposed at least partially within a solenoid enclosure or other valve enclosure and another end for being disposed at least partially outside of the enclosure. In at least one embodiment, one more test leads can be adapted for removable coupling with one or more components of a valve, which can include a solenoid coil or one or more other electrical components of the valve, such as wiring, terminal blocks, or other valve components for supporting operation of a valve actuator, such as a solenoid actuator. One or more electrical couplers can be at least partially embedded or otherwise disposed in a plug of a test connection. In at least one embodiment, a plug can be at least partially elastomeric. In at least one embodiment, a plug or test connection can be configured for threadingly coupling with a conduit opening, such as by having male or female threads adapted for engaging mating threads on or in a conduit opening or one or more valve components coupled thereto or therewith. In at least one embodiment, a plug can be adapted for coupling with a conduit opening by press fit, such as by interference fit, or friction fit, separately or in combination, in whole or in part.

In at least one embodiment, a test connection or a portion thereof, such as a plug, can have one or more outside dimensions, such as a major dimension, a minor dimension, or another dimension. In at least one embodiment, a plug can have a dimension or cross-sectional area that varies along its length (or another dimension or direction). In at least one embodiment, a portion of a plug, such as an end or other portion, can have an outside dimension or other dimension that is larger or smaller than a dimension of another portion of the plug, which can include another end of the plug.

In at least one embodiment, a test connection or a portion thereof, such as a plug, can be at least partially cylindrical. For example, at least a portion of a plug between two ends, which can include one or more of the ends or portions thereof, can be at least partially cylindrical. A plug can, but need not, have one or more ribs, such as annular or other ribs, that extend radially outwardly from an exterior surface or other portion thereof. As another example, a plug can, but need not, have one or more other ribs, such as a linear rib that extends radially outwardly from an exterior service or other portion thereof. For instance, a plug can have one or more linear or other ribs parallel or about parallel to an axis thereof, such as a central longitudinal axis, which rib or ribs can, but need not, intersect one or more other ribs, such as one or more annular ribs (if present). In at least one embodiment of a plug having a plurality of ribs, two or more ribs can have heights or other dimensions relative to an exterior surface or other portion of a test connection. Two or more ribs can have a height or other dimension(s) that are the same or that are different. For example, in at least one embodiment, one or more annular ribs can have a different dimension than one or more linear ribs, which can include being taller or shorter than such ribs, separately or in combination, in whole or in part. Two or more ribs can, but need not, intersect along a portion of the body of a test connection or plug. In at least one by embodiment, a test connection or plug can include two or more ribs that are at least partially perpendicular or orthogonal to one another. As another example, two or more ribs can be at least partially parallel to one another.

In at least one embodiment a valve, such as a solenoid valve, can include an enclosure or housing, such as a solenoid enclosure, having one or more conduit openings for having one or more wires or other conduits routed there in or therethrough. For example, a conduit opening or other opening can be adapted for allowing wires or other conduits to communicate with one or more components inside of a valve enclosure or housing and with one or more components or valve system components disposed outside of the valve enclosure or housing, such as, for example, valve control or monitoring equipment, or as another example, one or more other valves. A valve, such as a solenoid valve or other type of valve, can include one or more test connections coupled thereto or adapted to be coupled thereto, which can be or include any test connection according to the present disclosure.

In at least one embodiment, a method of configuring a valve, such as a solenoid valve, for installation or operation can include providing a test connection for coupling therewith. A valve, such as a solenoid valve, can have an enclosure, such as a solenoid enclosure, coupled to a valve body and can have one or more conduit openings in fluid communication with a portion of the valve. The conduit opening can be adapted for having one or more wires or other conduits dispose therethrough and, in at least one embodiment, can be at least partially disposed in a cover or other portion of the valve, which can be or include any portion of a valve enclosure or housing. In at least one embodiment, a method of configuring a solenoid valve, such as for shipment, testing, operation, or installation, can include providing a test connection or a plurality of test connections. One more test connections can include a plug adapted to be removably coupled to a conduit opening, one or more electrical couplers, which can be coupled to the plug, and one or more test leads electrically coupled to the one or more electrical couplers. A test lead can have a first and for other end for electrical communication with a solenoid coil of a solenoid valve and/or one or more other electrical components of a valve, whether a solenoid valve or otherwise. A method can include removably coupling the plug to a conduit having and removably coupling at least one of a plurality of test leads in electrical communication with a solenoid coil or other electrical component.

In at least one embodiment, a method can include sealingly coupling one or more plugs to one or more conduit openings of valve, which can be or include fully or partially watertight coupling, such as for at least minimizing ingress or egress of water, moisture, dust or other foreign substances into or out of a valve enclosure housing. In at least one embodiment, a method can include coupling one or more plugs to a valve cover and coupling the cover to a valve enclosure or housing. A method can include coupling at least one wire in electrical communication with one or more electrical couplers of a test connection. A method can include testing a valve, such as a solenoid valve, without uncoupling the test connection from the valve or, as another example, without uncoupling it cover or other removable housing or enclosure portion from a valve. A method can include uncoupling one or more test leads from one or more valve components and removing a test connection from a valve. A method can include replacing one or more test connections with a wiring harness or other components routed in or through the conduit opening, such as one or more wires or components affiliated with permanent installation of the valve in a valve system or otherwise.

Other and further embodiments utilizing one or more aspects of the systems and methods disclosed herein can be devised without departing from the spirit of Applicants' disclosure. For example, the systems and methods disclosed herein can be used alone or to form one or more parts of other valves, valve components and/or fluid control systems. Further, the various methods and embodiments of the test connections can be included in combination with each other to produce variations of the disclosed methods and embodiments. Discussion of singular elements can include plural elements and vice-versa. References to at least one item followed by a reference to the item can include one or more items. Also, various aspects of the embodiments can be used in conjunction with each other to accomplish the understood goals of the disclosure.

Unless the context requires otherwise, the words "comprise," "include," and "has" (including variations and conjugations thereof, such as "comprises," "including," "have" and so forth) should be understood to imply the inclusion of at least the stated element or step or group of elements or steps or equivalents thereof, and not the exclusion of a greater numerical quantity or any other element or step or group of elements or steps or equivalents thereof. The devices, apparatuses and systems can be used in a number of directions and orientations. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components and/or can be combined into components having multiple functions. The term "fluid(s)" as used herein includes any substance or material capable of flowing, such as, for example, liquid(s), gas(es) and combinations thereof (regardless of whether one or more solids or other non-fluids may be present therein).

The embodiments have been described in the context of preferred and other embodiments and not every embodiment of Applicants' disclosure has been described. Obvious modifications and alterations to the described embodiments are available to those of ordinary skill in the art having the benefits of the present disclosure. The disclosed and undisclosed embodiments are not intended to limit or restrict the scope or applicability of Applicants' disclosures, but rather, in conformity with the patent laws, Applicants intend to fully protect all such modifications and improvements that come within the scope or range of equivalents of the claims.

What is claimed is:

1. A test connection for a solenoid valve having a solenoid enclosure coupled to a valve body, the solenoid enclosure having a conduit opening configured to have wires disposed there through, the test connection comprising:
    a plug configured to be removably coupled to the conduit opening, wherein the plug has a first end configured to be disposed outside of the solenoid enclosure and a longitudinally opposite second end configured to be disposed inside the solenoid disclosure when the test connection is coupled to the solenoid enclosure, and wherein the first end of the plug has an outside dimension greater than an outside dimension of the second end of the plug, wherein at least a portion of the plug between the first and second ends is cylindrical and comprises a plurality of annular ribs that extend radially outwardly therefrom;
    an electrical coupler coupled to the plug; and
    a plurality of test leads electrically coupled to the electrical coupler;
    wherein each of the plurality of test leads has a first end configured to be wired in electrical communication with a solenoid coil of the solenoid valve.

2. The test connection of claim 1, wherein the plug is configured to sealingly couple to the conduit opening.

3. The test connection of claim 1, wherein the test leads are configured to be removably coupled in electrical communication with the solenoid coil.

4. The test connection of claim 1, wherein the plug is configured to be threadedly coupled to the conduit opening.

5. The test connection of claim 1, wherein plug is configured to couple with the conduit opening by press fit.

6. A method of configuring a solenoid valve for installation, the solenoid valve having a solenoid enclosure configured to be coupled to a valve body and having a cover with a conduit opening configured to have wires disposed there through, the method comprising:
    providing a test connection, wherein the test connection comprises
        a plug configured to be removably coupled to the conduit opening,
        an electrical coupler coupled to the plug; and
        a plurality of test leads electrically coupled to the electrical coupler;
        wherein each of the plurality of test leads has a first end configured to be wired in electrical communication with a solenoid coil of the solenoid valve;
    removably coupling the plug to the conduit opening;
    removably coupling at least one of the plurality of test leads in electrical communication with the solenoid coil; and
    replacing the test connection with a wiring harness routed through the conduit opening.

7. The method of claim 6, further comprising sealingly coupling the plug to the conduit opening.

8. The method of claim 6, further comprising coupling the cover to the solenoid enclosure.

9. The method of claim 8, further comprising:
    coupling at least one wire in electrical communication with the electrical coupler; and
    testing the solenoid valve without uncoupling the cover from the solenoid enclosure.

10. The method of claim 6, further comprising:
    uncoupling the at least one of the plurality of test leads; and
    removing the test connection from the solenoid valve.

11. The test connection of claim 1, further comprising at least one linear rib that extends radially outwardly from the cylindrical portion of the plug.

12. The test connection of claim 11, wherein the at least one linear rib has a height greater than a height of at least one of the plurality of annular ribs.

13. The test connection of claim 11, wherein the at least one linear rib intersects at least one of the plurality of annular ribs.

14. The test connection of claim 11, wherein the at least one linear rib is perpendicular to at least one of the plurality of annular ribs.

15. A test connection for a solenoid valve having a solenoid enclosure coupled to a valve body, the solenoid enclosure having a conduit opening configured to have wires disposed there through, the test connection comprising:
   a plug configured to be removably coupled to the conduit opening, wherein the plug has a first end configured to be disposed outside of the solenoid enclosure and a longitudinally opposite second end configured to be disposed inside the solenoid disclosure when the test connection is coupled to the solenoid enclosure, and wherein at least a portion of the plug between the first and second ends is cylindrical and comprises a plurality of annular ribs that extend radially outwardly therefrom;
   an electrical coupler coupled to the plug; and
   a plurality of test leads electrically coupled to the electrical coupler;
   wherein each of the plurality of test leads has a first end configured to be wired in electrical communication with a solenoid coil of the solenoid valve.

16. The test connection of claim 15, further comprising at least one linear rib that extends radially outwardly from the cylindrical portion of the plug.

17. The test connection of claim 16, wherein the at least one linear rib has a height greater than a height of at least one of the plurality of annular ribs.

18. The test connection of claim 16, wherein the at least one linear rib intersects at least one of the plurality of annular ribs.

19. The test connection of claim 16, wherein the at least one linear rib is perpendicular to at least one of the plurality of annular ribs.

* * * * *